United States Patent
El Mghazli et al.

(10) Patent No.: US 10,880,064 B2
(45) Date of Patent: Dec. 29, 2020

(54) SYSTEM AND METHOD FOR DATA TRANSMISSION BETWEEN A SERVER UNIT AND A REMOTE UNIT IN A COMMUNICATION NETWORK

(71) Applicant: NOKIA TECHNOLOGIES OY, Espoo (FI)

(72) Inventors: Yacine El Mghazli, Arcueil (FR); Francois Taburet, Montrouge (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/382,469

(22) Filed: Apr. 12, 2019

(65) Prior Publication Data

US 2019/0319765 A1  Oct. 17, 2019

(30) Foreign Application Priority Data

Apr. 12, 2018 (EP) .................... 18305447

(51) Int. Cl.
  *H04L 5/00* (2006.01)
  *H04B 7/0413* (2017.01)
  *H04W 72/12* (2009.01)

(52) U.S. Cl.
  CPC ......... *H04L 5/0053* (2013.01); *H04B 7/0413* (2013.01); *H04W 72/1263* (2013.01); *H04W 72/1273* (2013.01)

(58) Field of Classification Search
  CPC ... H04W 72/1263–1273; H04L 5/0053; H04B 7/0413; H04B 7/0613
  See application file for complete search history.

(56) References Cited

U.S. PATENT DOCUMENTS

2012/0057560 A1 * 3/2012 Park ................. H04L 1/189
370/329

FOREIGN PATENT DOCUMENTS

EP   3160194 A1 * 4/2017 ........ H04W 72/0473

OTHER PUBLICATIONS

Communication pursuant to Article 94(3) EPC issued in corresponding European Patent Application No. 18 305 447.7, dated Jun. 16, 2020.

* cited by examiner

*Primary Examiner* — Eric Myers
(74) *Attorney, Agent, or Firm* — Squire Patton Boggs (US) LLP (57) ABSTRACT

There is provided a server unit in a communication network implementing a MIMO wireless communication, the server unit being configured to receive data from a backhaul transport network and perform baseband processing, the server unit being configured to transmit a data signal derived from the processed data to a remote unit over a number of MIMO layers, through a fronthaul link. The data signal transmitted to the remote unit comprising physical user data and physical control data. The server unit comprises a control data mapper configured to select at least one MIMO layer, the control data mapper being further configured to map at least a part of the control data to the at least one selected MIMO layers. The server unit is configured to send a copy of the physical user data on each MIMO layer, and the control data on the selected MIMO layers mapped thereto.

16 Claims, 7 Drawing Sheets

SYSTEM AND METHOD FOR DATA TRANSMISSION BETWEEN A SERVER UNIT AND A REMOTE UNIT IN A COMMUNICATION NETWORK

The invention generally relates to wireless communications networks and, in particular, to systems, methods, and computer program products for data transmission between a server unit and a remote unit in a wireless communication network.

BACKGROUND

Modern mobile communications networks have seen dramatic developments over the past years. In this context, LTE (Long Term Evolution) networks were deployed to meet ever increasing demands in terms of traffic capacity and speed. LTE is a standard for high-speed wireless communication for mobile devices and data terminals.

A conventional LTE architecture generally comprises one or more user equipments (e.g. mobile equipment), an Evolved UMTS Terrestrial Radio Access Network (E-UTRAN), and an Evolved Packet Core (EPC). The E-UTRAN manages the radio communications between each user equipment and the EPC. The E-UTRAN comprises one or more evolved base stations, denoted eNodeB or eNB. Each eNB is a base station that controls the user equipments in one or more cells.

A functional split exists between the E-UTRAN and the EPC. In traditional Radio Access Networks or RAN deployment of LTE, the hardware and processing equipment of each eNB is located close to its antenna tower. In a conventional RAN deployment of an LTE network, each eNB comprise a Baseband unit or BBU and a base band processing unit, also called Remote Radio Head or RRH. The LTE BBU sends the digitalized RF signal to a RRH under the form of digital IQ samples. This results in a higher data rate of traffic than would be seen in the corresponding backhaul network, making the economics of the fronthaul network particularly difficult. As a result, the network has to work under great constraints both in terms of bandwidth and latency.

Further, physical links only exist between the eNBs and their corresponding access network gateway. As a result, messages between the eNBs are required to travel through costly backhaul links, which results in limited latency and cooperation between the base stations eNBs. With emerging wireless technologies such as Multiple-Input Multiple-Output (MIMO) improved cooperation is needed between the eNBs.

In order to solve this problem, Cloud-Radio Access Network or C-RAN, has been introduced as a new cloud architecture as disclosed in "C-RAN The Road Towards Green RAN, White Paper", China Mobile Research, October 2011.

C-RAN technology splits the LTE stack between a Server Unit (SU) comprising the BBU and a Remote Unit (RU) comprising the RRHs at the antenna site. In contrast to RAN, C-RAN detaches the Baseband units (BBU) from the eNBs. In a C-RAN deployment, each RRH of the RU performs the baseband processing for the associated eNB and thus remains close to the antenna tower. Further, the BBUs are centralized into a pool of shared BBUs forming the SU. The BBUs can be allocated dynamically. The centralized baseband pool SU of BBUs performs baseband (PHY/MAC) processing. BBUs of the SU are connected to the distributed RRHs of the RU (remote site) through via a high bandwidth low-latency optical network.

As a result, in a C-RAN, the baseband part can be subdivided into a traffic load dependent User Processing part, RU, and a traffic independent Cell processing part, SU. A Fronthaul (FH) link connects each RRH at the antenna site with the BBU pool (also called BBU cloud).

By centralizing the cell processing part in the RU, the RU can "only" transmits user traffic to the SU which changes as the LTE traffic varies, instead of a constant cell traffic. As a result, the amount of data that needs to be transported by the Fronthaul network is reduced, while Fronthaul resources (such as Wavelength Division Multiplexing lambdas) allow statistical gains.

However, such architecture is limited by the capacity and latency constraints of the fronthaul network connecting RU and SU.

In MIMO (spatial multiplexing) implementations of LTE used to increase the overall capacity of a cell and the expected data rate, the rate of the information transported on the Fronthaul is huge and is accordingly prohibitive. To address such constraint, it has been proposed to flexibly distribute the baseband functionality between the RRH and the pool of BBUs (Flexible Centralisation). In such approach, a part of the BBU processing is maintained at the RRH pool to avoid sending such information on the fronthaul.

In a MIMO implementation of LTE, there is one processing path per antenna. The Server Unit sends its control information on a plurality of MIMO layers (or streams) to enable spatial diversity or beam forming. However, this involves duplication of the control information in each MIMO layer.

In some existing deployments, an eCPRI interface (CPRI is the acronym for Common-Public Radio Interface) is implemented between the SU and the RU transporting digitised In-phase and Quadrature (IQ) radio samples are transported from the SU to the RU. The eCPRI interface is specified in eCPRI Specification V1.0, Tech. Rep. August 2017. In such deployments, identical Ethernet packets are sent on the fronthaul network, one for each MIMO layer. This results in a waste of fronthaul resources.

There is accordingly a need for an improved method and system for transmitting Ethernet packets on the fronthaul network that optimises the fronthaul resources.

SUMMARY

In order to address these and other problems, there is provided a baseband unit (also referred to as a server unit) in a communication network implementing a MIMO wireless communication, the baseband unit being configured to receive a data from a backhaul transport network and perform baseband processing, the baseband unit being configured to transmit a data signal derived from the processed data to a remote unit over a number of MIMO layers, through a fronthaul link, the communication network comprising a physical layer. The data signal transmitted to the remote unit comprises physical user data and physical control data. The baseband unit comprises a control data mapper configured to select at least one MIMO layer, the control data mapper being further configured to map at least a part of the control data to the at least one selected MIMO layers, the baseband unit being configured to send a copy of the physical user data on each MIMO layer, and the control data on the selected MIMO layers mapped thereto.

In an embodiment, the control data mapper may be configured to select at least one MIMO layer based on at least one layer selection metric.

The at least one layer selection metric may be based on one or more indicators comprised in the Channel Status Information (CSI), the indicators comprising a Channel Quality Indicator, a Precoding Matrix Index, a Rank Indicator.

In some embodiments, the control data mapper may be configured to map at least a part of the control data to the at least one selected MIMO layers depending on at least one control data selection metric.

In an embodiment, the at least one control data selection metric may be based on the Quality Of Service.

The control data mapper may be configured to select a unique MIMO layer, and to map all the control data to the MIMO layer.

Alternatively, the control data mapper may be configured to select at least two MIMO layers, the control data mapper being further configured to send a part of the control data on each selected MIMO layer mapped there to the part of the control data.

In another embodiment, the control data mapper may be configured to select at least two MIMO layers, the control data mapper being further configured to send all the control data on each selected MIMO layer, the number of selected MIMO layers being strictly inferior to the total number of MIMO layers.

The transmission direction may be a downlink direction, the user data comprising the downlink physical channels data and the control data comprising the downlink physical control channels and/or the downlink physical synchronization signals.

Alternatively, the transmission direction may be a downlink direction, the user data comprising the Physical Uplink Shared Channel (PUSCH) and the control data comprising the physical uplink control channel (PUCCH).

In some embodiments, the baseband unit of any preceding claim, wherein the processing of the physical layer is split over the baseband unit and the remote unit.

There is further provided a remote radio unit (RRU) in an communication network implementing a MIMO wireless network, the remote radio unit being configured to receive a data signal on a set of MIMO layers from a baseband unit (BBU) via a fronthaul communication link, the data signal comprising physical user data and one or more physical control data, the set of MIMO layers comprising one or more reference MIMO layers carrying the physical user data and at least a part of the physical control data, the remaining MIMO layers only carrying a copy of the user data, the remote radio unit being configured to communicate with at least one wireless mobile device via an air interface. The remote radio unit is configured to reconstruct the physical control channels on each MIMO layer from the physical control data carried by the one or more reference MIMO layers, in response to the receipt of the data signal.

There is also provided a method of transmitting data from a baseband unit to a remote unit in a communication network implementing a MIMO wireless communication, the baseband unit being configured to receive a data from a backhaul transport network and perform baseband processing, a data signal derived from the processed data being transmitted to the remote unit over a number of MIMO layers, through a fronthaul link, the communication network comprising a physical layer, the data signal transmitted to the remote unit comprising physical user data and physical control data. The method further comprises a step of selecting at least one MIMO layer, and mapping at least a part of the control data to the at least one selected MIMO layers, the method comprising sending a copy of the physical user data on each MIMO layer, and the control data on the selected MIMO layers mapped thereto.

There is further provided a computer program product for transmitting data from a baseband unit to a remote unit in a communication network implementing a MIMO wireless communication, the baseband unit being configured to receive a data from a backhaul transport network and perform baseband processing, a data signal derived from the processed data being transmitted to the remote unit over a number of MIMO layers, through a fronthaul link, the communication network comprising a physical layer, the data signal transmitted to the remote unit comprising physical user data and physical control data. The computer program product comprises:

a non-transitory computer-readable storage medium; and
program code stored on the non-transitory computer-readable storage medium that, when executed by one or more processors, causes the one or more processors to:
select at least one MIMO layer,
map at least a part of the control data to the at least one selected MIMO layers, and
send a copy of the physical user data on each MIMO layer, and the control data on the selected MIMO layers mapped thereto.

The various embodiments of the invention accordingly enable transmission of at least a part of the control data on a limited number of MIMO layers while the remaining layers only transmit the user data to the Remote Unit, thereby optimizing the resources.

BRIEF DESCRIPTION OF THE DRAWINGS

The accompanying drawings, which are incorporated in and constitute a part of this specification, illustrate various embodiments of the invention and, together with the 25 general description of the invention given above, and the detailed description of the embodiments given below, serve to explain the embodiments of the invention.

DETAILED DESCRIPTION

Embodiments of the invention provide methods and systems for transmission of data, comprising physical user data and physical control data, between a Server Unit (also referred to as a 'baseband unit') configured to perform baseband processing and a Remote Unit ((also referred to as a 'remote radio unit') in a communication network implementing a MIMO wireless communication, that optimizes the resources used to transmit the control data.

The communication network may be any communication network implemented according to wireless standards such as the Long Term Evolution (LTE), the LTE-advanced and any 5G standardization.

The following description of some embodiments of the invention will be made with reference to a LTE communication network for illustration purpose, although the skilled person will readily understand that the invention applies for the transmission of data, comprising physical user data and physical control data, between a server unit and a remote unit, in other types of communication networks.

Figure 1:
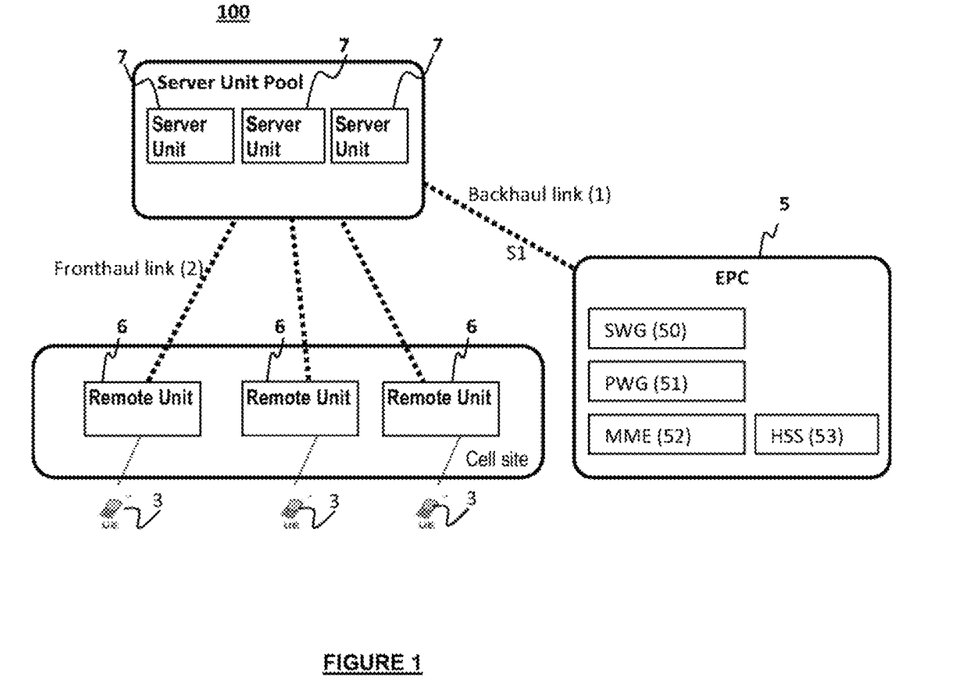
FIG. 1 depicts a LTE (Long Term Evolution) network using a C-RAN architecture, in accordance with some embodiments of the invention.

Referring to FIG. 1, there is shown an exemplary communication network in which embodiments of the invention may be implemented.

The communication network represented in FIG. 1 is a LTE (Long Term Evolution) network 100 using a C-RAN architecture. The CRAN network is configured to provide network services to one or more User Equipment 3 via wireless radio signals.

The CRAN comprises one or more base stations also called eNodeBs 4 ("eNBs"). The base stations may be also referred to as a "radio tower," a "node B" or a "cell site". The CRAN may include a plurality of radio towers and switching circuitry. Each base station eNB 4 is associated with one or more User Equipments 3 located within its cellular coverage.

An eNB refers to a base station which is in communication with a user equipment.

The CRAN facilitates network communication between the mobile devices across several networks (local or global for example).

Each user equipment 3 may be a stationary or fixed wireless portable device 25 configured to communicate with an eNB using wireless connections, such as a cellular phone, a handheld device, a tablet, a laptop computer, or a smart phone, etc.

The LTE network 100 further comprises an Evolved Packet Core EPC 5. The EPC 5 may comprise:
a Serving Gateway (SGW) 50,
a PDN Gateway (PGW) 51,
a MME (Mobility Management Entity) 52, and
a HSS (Home Subscriber Server) 53.
The EPC 5 is connected to external networks.

Each eNB 4 is connected with the EPC 5 through a S1 interface. Each eNB 4 can be further connected to other neighboring eNB by use of a X2 interface.

The SGW 50 may be coupled to the MME 52 using a S6 protocol link and to the PGW 51 using a S5 protocol link.

The Home Subscriber Server ("HSS") 53 may be coupled to the MME 52 and is configured to store subscriptions and authentication information.

The MME 52 is the main control node of the LTE network. It manages the control plane. The MME 52 is configured to manage the signalling related to mobility and security for network access. The MME 52 may be further responsible for idle mode UE paging and tagging procedure including retransmissions.

The MME 52 is further coupled to the HSS 53 to access information from the HSS for UE authentication or user handover. The HSS 53 is responsible for the management and verification of user subscription based on stored information. A session(s) can be established after authentication of a user.

The SGW 50 may be used to route and forwards user data packets between the base stations eNBs 3, the MME 52, and the PGW 51. The SGW 50 can terminate the downlink data path and triggers paging when downlink data arrives for an idle state UE. Among other functions, the SWG 50 may manage UE contexts and network internal routing information, while performing paging idle UEs.

The PGW 51 is the point of interconnect between the EPC 5 and the external IP networks, called PDN (Packet Data Network) such as a radio access network or the Internet. The PGW 51 is configured to route packets to and from the PDNs. It forms the point of exit and entry of traffic for each UE. PGW 51 includes among other functions, device connectivity, packet filtering for each user, charging support, policy enforcement, packet screening, etc.

The cloud radio access network (C-RAN) architecture comprises one or more multiple Radio Units 6 or RUs (also called Remote Radio Heads or RRHs) and a pool of Server units comprising one or more Server Units 7 or SUs (each Server Unit 7 is also referred to as a 'Base Band Unit' BBU, or a 'Central Unit' CU, or a 'Digitised Unit' DU).

The Server Unit Pool 7 may be connected to the EPC 5 via a Backhaul link 1. The interface between the Radio Access Network (RAN) and the EPC 5 is called "S1". Such S1 Interface is used between eNBs 4 and the EPC 5 (specifically by the MME 52 and the S-GW 40) and forms a "many-to-many" interface. In the user plane, the interface S1 is based on GTP User Data Tunneling (GTP-U). In the control plane, the interface S1 is similar to Radio Access Network Application Part (RANAP), with some simplifications and changes due to the different functional split and mobility within the EPS (Evolved Packet System) formed by the LTE and the EPC 5. The S1 interface includes a S1-CP part (control) and a S1-UP part (user plane). The signalling transport on S1-CP may be based on SCTP (Stream Control Transmission Protocol). The signalling protocol for the interface S1 is called S1-AP.

Each Radio unit RU 6 is connected to the Server Unit SU 7 through a Fronthaul link (FH) 2.

The Server Unit 7 is configured to perform baseband processing. More generally, the Server Units 7 implement the protocol stack of the RUs 6.

The fronthaul link 2 may be configured to carry digitized baseband signals.

The RU 6 may provide wireless service to one or more User Equipments 3 (e.g. mobile stations). The RU 6 may comprise an antenna array of one or more horizontal antennas by one or more vertical antennas. Each User Equipment 3 may have at least on antenna.

The LTE system 100 of FIG. 1 comprises a set of communication layers including the physical layer (PHY), the media access control layer (MAC), the radio link control layer (RLC), the packet data convergence protocol layer (PDCP), and the radio resource control (RRC) layer.

The physical layer PHY can include the various hardware transmission components of a wireless communication system. The PHY Layer carries information from the MAC transport channels over the air interface.

The C-Ran architecture 100 may implement functional splits between the SU 7 and the RUs 6 in that a part of the baseband functionalities is implemented at the RU 6.

In some embodiments, CPRI (Common Public Radio Interface) may be used to provide an interface for the interconnection of the RUs 6 with the SUs 7, by means of the fronthaul link 2 (also called 'fronthaul network').

CPRI defines three different flows between the SU 7 and the RU 6 multiplexed onto a digital serial communication line:
- user plane data, transported in the form of one or more In-Phase and Quadrature (IQ) data flows, each IQ data reflecting the radio signal, after sampling and digitization of one carrier at one independent antenna element (Antenna Carrier);
- control and management plane transmitted by an in-band protocol or by higher-layer protocols;
- Synchronization and timing used for time and frame alignment.

The different split functionalities implemented between the SUs 7 and the RUs 6 can use centralized processing, such as IQ radio transportation, or a particular split at the LTE MAC/PHY interface (SU-to-RU pair) for example. The SUs 7 are configured to perform part of the LTE protocol layer processing (including base station processing down to the MAC layer) and may be fed with data from higher LTE layers.

In one embodiment, the LTE network 100 may implement a MIMO technique for transmission of data packets (also called data 'frames') in the CRAN network.

A LTE downlink frame may use multiple antenna ports to transmit data to the UEs 3, in order to increase data reliability (transmit diversity) or the data rate (spatial multiplexing).

In particular, spatial multiplexing can be used to send data to the UEs 3 which have more than one receive antenna. Spatial Multiplexing uses multiple antenna ports to increase the data transmission capacity of the frame by using space as a dimension for sending data.

In a MIMO implementation of the LTE network 100, a transmitter of a data signal may comprise m transmit antennas (transmitters), and each receiver of a data signal may comprise n receive antennas (receivers) through a transmission channel represented by a channel matrix H (also called transmission matrix). For example, the direct connection from antenna 1 of the transmitter to the antenna 1 of a receiver is specified with component h11 of the channel matrix H, the indirect connection from antenna 1 of the receiver to antenna 2 of the transmitter is identified as component h21 of the channel matrix H, etc. The channel matrix H has accordingly a dimension n×m.

$$H = \begin{bmatrix} h_{11} & h_{12} & h_{..} & h_{1m} \\ h_{21} & h_{22} & h_{..} & h_{2m} \\ h_{..} & h_{..} & h_{..} & h_{.m} \\ h_{n1} & h_{n2} & h_{n} & h_{nm} \end{bmatrix}$$

Data to be transmitted to the UEs 3 is divided into a number M of independent data streams or layers. The number M of data layers is less than or equal to the number of antennas. For asymmetrical antenna constellations (m different from n), the number M is smaller or equal the minimum number of antennas. In MIMO implementations, at least two layers are used and up to four layers are generally allowed. The number of layers is always less than or equal to the number of antennas.

In such a MIMO implementation, each receiver sees the output of the channel which is composed of a combination of the outputs from the transmitters. The receivers are configured to separate the received data streams and demodulate the data.

Embodiments according to the invention provide an improved packet transmission between the SU 7 and the RU 6 which optimizes the resources.

In one embodiment, the SU 7 transmits Ethernet packets (or Ethernet frames) to the RU 6 through one or more radio channels, on the Fronthaul network.

According to the Ethernet Fronthaul traffic type, the LTE Physical (PHY) layer previously determines a number of radio channels for the transmission between the SU 7 and the RU 6, each having a given encoding type and position in the LTE sub-frame. Each radio channel is further associated with a specific Ethernet packet type that transports the information of the channel. The Ethernet packet type may be defined by the header of the Ethernet frame. Accordingly, each radio channel can be distinguished from another using the Ethernet frame header associated with the Ethernet packet type of the channel. This enables separating control and data traffic on the Fronthaul.

The control packets are separated from the other radio channels, each channel corresponding to a specific Ethernet packet type.

Embodiments of the invention provide a Server Unit 7 (baseband unit) configured to receive data from a backhaul transport network and perform baseband processing, in a communication network implementing a MIMO wireless communication, the Server Unit 7 being configured to transmit a data signal derived from the processed data to a remote unit 6 over a number of MIMO layers, through the fronthaul link 2, with the data signal transmitted from the Server Unit 7 to the Remote Unit 6 comprising physical user data and physical control data. According to the embodiments of the invention, the Server Unit 7 is configured to select at least one MIMO layer, and to map at least a part of the control data to the at least one selected MIMO layers. The Server Unit 7 is further configured to send a copy of the physical user data on each MIMO layer, and the control data on the selected MIMO layers mapped thereto.

The Remote Unit 6 (also referred to as a 'Radio remote unit') may be configured to receive the data signal from the Server Unit 7 transmitted on the set of MIMO layers via the fronthaul communication link 2. The set of MIMO layers thus comprise one or more reference MIMO layers carrying the physical user data and at least a part of the physical control data, the remaining MIMO layers only carrying a copy of the physical user data. The Remote Unit 6 is configured to reconstruct the physical control channels on each MIMO layer from the physical control data carried by the one or more reference MIMO layers, in response to the receipt of the data signal.

This enables transmission of at least a part of the control packets on a limited number of MIMO layers while the remaining layers only transmit the user data packets to the Remote Unit 6.

Figure 2:
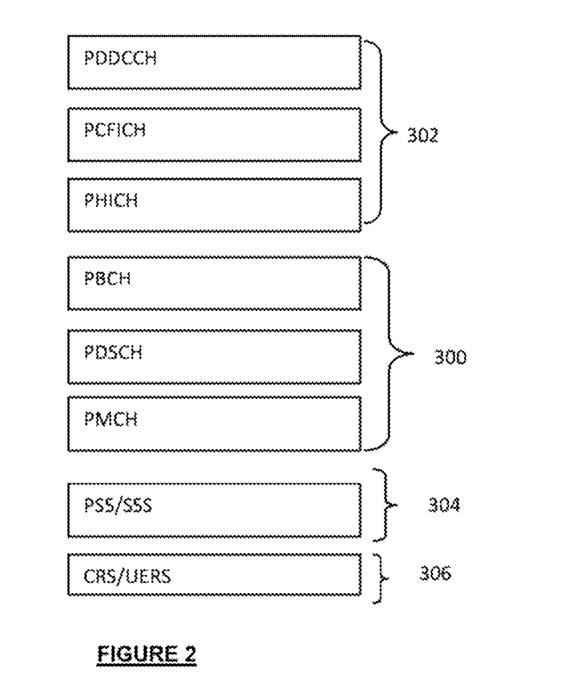
FIG. 2 represents exemplary data transmitted from a server unit to a remote unit, in the downlink.

FIG. 2 represents exemplary data which can be included in an Ethernet frame transmitted from the SU 7 to the RU 6, in the downlink.

As shown in FIG. 2, the SU 7 can exchange with the SU 6 a number of downlink physical channels to carry information blocks received from the MAC layer and from the higher layers. Such physical channels are used to segregate the different types of data and allow them to be transported across the radio access network. The physical channels may comprise transport channels 300 and L1/L2 control channels 302.

Physical Channels indicate where information is transmitted over the air. Data and signaling messages are carried on physical channels between the different levels of the physical layer.

Transport channels may be used to carry data between the MAC and PHY layer. Transport channels are mapped to physical layer channels which are then mapped to specific time-frequency resources. Transport Channels indicate how information is transmitted over the air (e.g. use of encoding, interleaving options to transmit data). Data and signaling messages are carried on transport channels between the MAC and the PHY layer.

Each downlink physical channel corresponds to a set of Resource Elements (RE) carrying information originating from higher layers.

The transport physical channels 300 may comprise:

a Physical Broadcast Channel (PBCH) carrying system information for UEs 3 requiring to access the network. The PCBCH specifically carries a Master Information Block (MIB) which is broadcast continuously by each base station 4, independently of the user connectivity. The PBCH may be transmitted using Space Frequency Block Code (SFBC) in case of multiple antennas.

a Physical Downlink Shared Channel (PDSCH) carrying user data in Transport Blocks (TB) passed from the MAC layer to the PHY layer once per Transmission Time Interval (TTI). The PDCH is also used to transmit broadcast information not transmitted on the PBCH which include System Information Blocks (SIB) and paging messages. The PDSCH can use the codeword CW1 on top of CW0.

A Physical Multicast Channel (PMCH) defining a physical layer structure for carrying Multimedia Broadcast and Multicast Services (MBMS). The PMCH is transmitted in dedicated subframes where the PDSCH is not transmitted.

The physical control channels 302 are transmitted within the first part of each subframe, called 'control region' followed by a 'data region'. The control channels can be used by a UE 3 to decode scheduling signaling assignment with limited delay. The size of control region can be dynamically varied on a per-subframe basis to match the real-time traffic.

The control channels may comprise:

a Physical Downlink Control Channel (PDCCH) carrying in the downlink information (resource assignment) which enables a UE 3 to identify the resources allocated in a subframe and control information, the control information being used by a UE 3 to identify the resources and the modulation scheme it has to use a number of TTI later to emit the data towards an eNB 4. The PDCCH is used in each Ethernet frame to signal which UEs have been allocated resources for uplink and downlink transmissions. An eNB 4 may transmit several pieces of data to each UE 3 using a message called Downlink Control Information (DCI). The DCI may be transmitted to a group of UE 3 or alternatively to a specific UE 3 to provide each UE of the group or the specific UE with information related to the resources allocated to the UE for the transmission of its data (payload). Accordingly, the information carried by the PDCCH may be directed to the UEs of the group or only to a specific UE. The PDCCH may further comprise a Cyclic Redundancy Check (CRC). Upon reception of the PDCCH by a given UE, to identify if the PDCCH is directed to the receiving UE, the receiving UE may decode the CRC included in a PDCCH with the identifiers of the UE denoted Radio Network Temporary Identifier (RNTI). The PDCCH may be positioned on the first OFDM symbols. Multiple PDCCHs can be transmitted in a same subframe using Control Channel Elements (CCE). Each CCE is a nine set of four resource elements denoted Resource Element Groups (REG). PDCCH may be transmitted on an aggregation of one or several control channel elements CCE, depending on DCI payload and channel coding. A QPSK modulation may be used for the PDCCH. Different DCI format may be used (DCI format 0, 1, 1A, 1B, 1C, etc.). When a UE 3 recognizes a specific PDCCH, it may send back a response to the eNB in a PUCCH (Physical Uplink Control Channel) or PUSCH (Physical Uplink Shared Channel) channel. The PUCCH and the PUSCH are physical channels found in the LTE uplink. The PUSCH is the uplink channel corresponding to the PDSCH. The PUCCH provides various control signaling requirements. The response sent back through the PUCCH or the PUSCH may include information related to the quality of the radio link, which enables the eNB to adjust the transmission parameters (e.g. Error-Correcting Codes ECC, modulation type such as QPSK, 16 QAM, etc., MIMO indicators, etc.).

a Physical Control Format Indicator Channel (PCFICH) which is used to indicate the size of control region, for use in for later demodulation. The PCFICH is mapped to the 1st OFDM symbol. The PCFICH carries the Control Frame Indicator (CFI). The CFI comprises the number of OFDM symbols used for control channel transmission in each subframe. The CFI may be mapped to 16 Resource Elements in the first OFDM symbol of each downlink frame using QPSK modulation.

a Physical Hybrid ARQ Indicator Channel (PHICH) which carries the HARQ ACK/NAK (HARQ is the acronym for Hybrid Automatic Repeat Request, ACK stands for AcKnowledgement, and NAK stands for Negative AcKnowledgement) which indicates to a User Equipment 3 whether a base station 4 received uplink user data carried on the PUSCH. BPSK modulation may be used with a repetition factor of for robustness. Typically transmitted on the 1st OFDM symbol but also can be 3 OFDM symbols duration.

The PHICH configuration is part of the system information transmitted on PBCH.

An uplink frame may comprise uplink user data signals (PUSCH), random-access requests (PRACH), user control channels (PUCCH), and sounding reference signals (SRS). The Physical Random Access Channel (PRACH) may be used by an uplink user to contact a eNB 4. A UE 3 may transmit a PRACH to ask for PUSCH allocations. A base station 4 may use the downlink control channel PDCCH to indicate where the UE 3 can transmit PUSCH.

A downlink frame may comprise the information being sent to the User Equipments 3 which are connected to a given base station 4, synchronization signals 304 (such as Primary Synchronization Signal (P-SS), or Secondary Synchronization Signal (S-SS)), Reference signals (such as Cell specific Reference Signal (C-RS) or UE-specific Reference Signal (UE-RS)), and control channels. The PSS and SSS may be used for cell synchronization of wireless User Equipements 3 by identifying the physical cell Identifier ID and the frame boundaries of the LTE resource grid.

A downlink frame (from a base station 4 to a User Equipment 3) may comprise the information being sent to the UEs 3 that are currently connected to a base station eNB 4.

Figure 3:
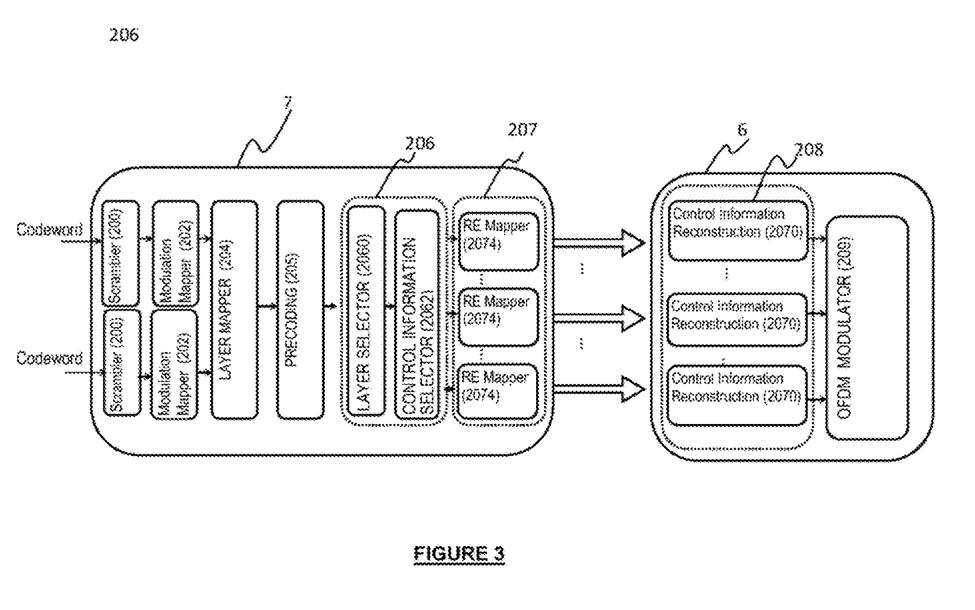
FIG. 3 represents the transmission chain split between the server unit and the remote unit for performing codeword transmission, in the downlink direction, according to some embodiments.

FIG. 3 shows the transmission chain split between the SU 7 and the RU 6 for performing codeword transmission, in the downlink direction, in a MIMO implementation of a LTE network, according to some embodiments.

As used herein, a "Codeword" refers to separate streams of data comprising information to be sent through a physical channel before the data streams are formatted for transmission.

User Equipment data are multiplexed into codewords. Two codewords denoted CW0 and CW1 are defined for a LTE network. Each channel uses CW0. The codeword CW1 is only available when using spatial multiplexing.

The data packets from a SU 7 may be transported over a network such as an Ethernet network (data packets thus represent data packets) and received by a RU 6. The following descriptions of some embodiments of the invention will be made with reference to exchange of Ethernet data packets.

In the downlink direction, the SU 7 may send the information to the RU 6 to generate a passband signal to transmit over the physical antennas.

The SU 7 may be configured to generate and sample the radio signal, before sending the sampled signal to a RU 6. Each RU 6 may be configured to reconstruct the waveform and transmit the reconstructed waveform over the air. The RU may be further configured to perform MAC, RLC and PDCP layer processing.

A Fronthaul Interface Library (FIL) may be used to encapsulate data exchanges between functional split entities and provide mapping functions for mapping to the split functionalities.

The transmit chain at the SU 6 may comprise at least one scrambler 200, at least one Modulation Mapper 200, a layer mapper 204, a precoder 205 and a Resource Allocator 207 which may comprise one resource selector 2074 per MIMO layer.

Each scrambler 200 may scramble the data in each codeword based on a scrambling sequence in order to prevent burst errors. Each scrambler 200 provides binary data which are input to a Modulation Mapper 202. Each Modulation Mapper 202 may be configured to modulate the data that is to be transmitted through a particular channel into the codewords for that channel. One or the two codewords CW0 and CW1 may be used depending on the conditions of the channel.

More specifically, each Modulation Mapper 203 is configured to split the binary data into chunks using a particular modulation. For example, the binary data may be split into 6 bits if the modulation is a 64QAM. The chunks thus obtained are then mapped to complex valued modulation symbols by the Modulation Mapper 203.

The Layer Mapper 204 (also referred to as a 'demultiplexing block') may then map the scrambled and modulated codewords onto a number of MIMO layers (also called MIMO data streams). The data are thus split into layers (one to four layers for example). The number of modulation symbols in all layers is the same as the number of symbols in the codewords. At this stage of the transmit chain for the considered physical channel, the layer data remains specific to the physical channel. Each physical channel can have a different number of layers.

The Precoding block 205 may be configured to precode the layers using a precoding matrix. More specifically, the Precoding block 205 may be configured to multiply the layers matrix with the precoding matrix, thereby providing a set of modulation symbols that are to be mapped directly onto the subcarriers. The precoding block generates signals for each antenna port.

The precoding may be of spatial multiplexing precoding type, with or without Cyclic Delay Diversity CDD or Large Delay Diversity LDD. Spatial Multiplexing precoding may be used to reduce the correlation between the layers, thereby facilitating antenna port signals separation at the receiver. The precoding modifies the layer signals before transmission. The MIMO channel conditions may favor one layer over another.

It should be noted that the transmission chain can operated without such precoding. In an embodiment, the precoding block 205 may be replaced for example by a beamforming block configured to modify the transmit signals to give the best carrier to interference and noise ratio (CINR) at the output of the channel. The following description of some embodiments of the invention will be made with reference to a transmission chain comprising a precoding block 205 for illustration purpose only.

The Layer Mapper 204 and the precoding block 205 forms MIMO-related processing.

The subcarriers provided by the precoding block 205 are sent to the Resource Allocator 207 which allocates the symbols to resource elements and transmit Ethernet Frames thus obtained to the antenna ports for transmission of the frames to the RU 6.

In the time domain, each frame may be divided into a number of equally sized sub-frames. Scheduling may be performed a sub-frame basis for both the downlink and uplink. Each sub-frame may comprise a number of equally sized slots, each slot consisting of a number of OFDM symbols. The transmission can be scheduled by Resource Blocks (RB) each of which consists of a number k of consecutive sub-carriers for the duration of one slot in the frequency domain and of a number of consecutive OFDM symbols in the time domain. A Resource Element (RE) refers to the smallest defined unit consisting of one OFDM sub-carrier during one OFDM symbol interval. Each Resource Block (RB) designates a number of Resource Elements (RE). Resource blocks (RB) are used to map physical channels to resource elements RE.

In a MIMO implementation of the LTE network, the MIMO layers are transmitted and received by multiple antennas, and each complex modulation symbols is mapped to a particular antenna port. In such MIMO implementation, each Resource Element (RE) may be identified by an antenna port, a sub-carrier position, and an OFDM symbol index within a radio frame, where a radio frame has a predefined duration. Each radio frame comprises a number of sub-frames.

According to some embodiments of the invention, the transmit chain further comprises a control information Mapper 206 (also referred to as a 'control data mapper') configured to dynamically map the control information (control channels) to one or more selected MIMO layers, the number of selected layers being strictly inferior to the total number of MIMO layers. The control information mapper 206 may comprise a layer selector 2060 configured to select a number of MIMO layers on which the control information are to be transmitted based on at least one layer selection metric.

Each LTE signal sent from SU 7 to RU 6 is transported in a specific Ethernet packet type. The control packets can be distinguished from the data traffic. On the RU side, such control packets are used by all MIMO layers in order to recreate the full signal for the transmission (TX) antennas.

In one embodiment, the layer selector 2060 may select a number of MIMO layers on which the control information are to be transmitted based on a layer selection metric represented by at least one indicator of Channel Status Information (CSI). The CSI represents a metrics quantifying the quality of the channel (i.e. how good or bad the channel is) at a given time. The CSI comprises three main indicators (also called 'components'):
- a CQI (Channel Quality Indicator)
- a PMI (Precoding Matrix Index)
- a RI (Rank Indicator).

It should be noted that for every CSI report, only a part of the above indicators CQI, PMI, RI can be measured. Depending on the situation and on the configuration of the network, a UE may perform different combination of measurements.

In one embodiment, the layer selector 2060 may select a number of MIMO layers on which the control information are to be transmitted based on a combination of at least two CSI indicators among CQI, PMI and RI.

The Control Information Mapper 206 may further comprise a control information selector 2062 configured to select the control information to map to the selected MIMO layers based on at least control information selection metric, such as a metric based on the Quality of Service QoS. For example, the control information selector 2062 may be configured to map the control information to the selected MIMO layers based on predefined QoS constraints, known by the MAC scheduler of the LTE system.

As used herein, the term 'control information' or 'control data', used in the context of data transmitted on the MIMO layers, refers to a physical control channel 302 (e.g. the downlink control channels PDCCH, PCFICH, PHICH, PBCH) or a synchronization signal 304 (such as for example the downlink synchronization channels PSS, SSS).

Instead of sending identical control information on the several MIMO layers, the Server Unit 7 thus determine for each MIMO layer which control information to be sent on each layer of a set of selected MIMO layers, based on predefined control information selection metric(s), and map the control signal thus determined to one or more selected MIMO layers. The Server Unit 7 will thus transmit on each selected MIMO layer the control signals mapped to this MIMO layer.

In one embodiment, the Control Information Mapper 206 may be configured to map all the control signals to a unique MIMO layer, such MIMO layer being selected based on predefined layer selection metrics, while sending only user data (PDSCH) on the other MIMO layers without any control information. Accordingly, the SU 7 will send on the MIMO layers which are different from the selected MIMO layer same PDSCH, without any control information. The PDSCH channel corresponds to modulated and compressed complex-valued frequency-domain samples of the physical downlink shared channel.

For example, considering three MIMO layers, the SU 7 may send the following data, in the downlink (from User Equipment to Base Station):
1. on LAYER 1:
   Control signals: PDCCH, PCFICH, PHICH, PBCH, PSS, SSS
   User data signal: PDSCH
2. On LAYER 2:
   User data signal: PDSCH
3. On LAYER 3:
   User data signal: PDSCH In still another embodiment, the Control Information Mapper 206 may select at least two MIMO layers among all the MIMO layers based on predefined layer selection metric(s) for transmission of at least a part of the control signals. The number of selected MIMO layers may be advantageously strictly inferior to the total number of MIMO layers. In such embodiment, the Control Information Mapper 206 may further determine which control signals to transmit on each of the selected MIMO layers. Accordingly, different control signals may be sent on the selected MIMO layers while the same PDSCH is sent on the other unselected MIMO layers without any control information.

For example, considering four MIMO layers, the SU 7 may select LAYER 1 and LAYER 4 based on predefined layer selection metric(s) and send the following data, in the downlink (direction from User Equipment to Base Station):
1. on LAYER 1:
   Control signals: PDCCH, PCFICH,
   User data signal: PDSCH
2. On LAYER 2:
   User data signal: PDSCH
3. On LAYER 3:
   User data signal: PDSCH
4. on LAYER 4:
   Control signals: PHICH, PBCH, PSS, SSS
   User data signal: PDSCH In yet another embodiment, the Control Information Mapper 206 may be configured to select one or more MIMO layers for transmission of the control signals, according to predefined layer selection metric(s). The Server Unit 7 may then transmit all the control signals on each of the selected MIMO layers. Accordingly, in such embodiment, all the control signals are sent on each selected MIMO layer while the same PDSCH is sent on the other unselected MIMO layers without any control information.

For example, considering four MIMO layers, the SU 7 may select LAYER 1 and LAYER 4 based on predefined layer selection metric(s) and send the following data, in the downlink (from User Equipment to Base Station):
1. on LAYER 1:
   Control signals: PDCCH, PCFICH, PHICH, PBCH, PSS, SSS
   User data signal: PDSCH
2. On LAYER 2:
   User data signal: PDSCH
3. On LAYER 3:
   User data signal: PDSCH
4. on LAYER 4:
   Control signals: PDCCH, PCFICH, PHICH, PBCH, PSS, SSS
   User data signal: PDSCH The data are thus transmitted from the SU 7 to the RU 6, with a reduced number of MIMO layers carrying the control information. The RU receives the data transmitted on each MIMO layer from the SU 7. The RU 6 may comprise a reconstruction unit 208 comprising a control information reconstruction unit 2080 associated with each MIMO layer configured to reconstruct the control information for the MIMO layer. If the MIMO layer is an unselected MIMO layer, the control information reconstruction unit 208 may communicate with the control information reconstruction unit 208 of at least one selected MIMO layer to receive a copy of the control information sent on this unselected MIMO layer and reconstruct all the transmitted data including the control information. This results in all the data, including the control information, being reconstructed by each MIMO layer.

After reconstruction of the data at the RU 6, the symbols may be processed by an OFDM Modulator 209 using Inverse Fast Fourier Transform (IFFT) to convert each symbol into time data.

A CP adder may be used at the RU append a cyclic prefix CP to the time data.

The uplink transmission structure is similar to the downlink transmission structure. The uplink transmission chain may use a Single Carrier Orthogonal Frequency Division Multiplexing (SC-OFDM) uplink modulation format.

Figure 4:
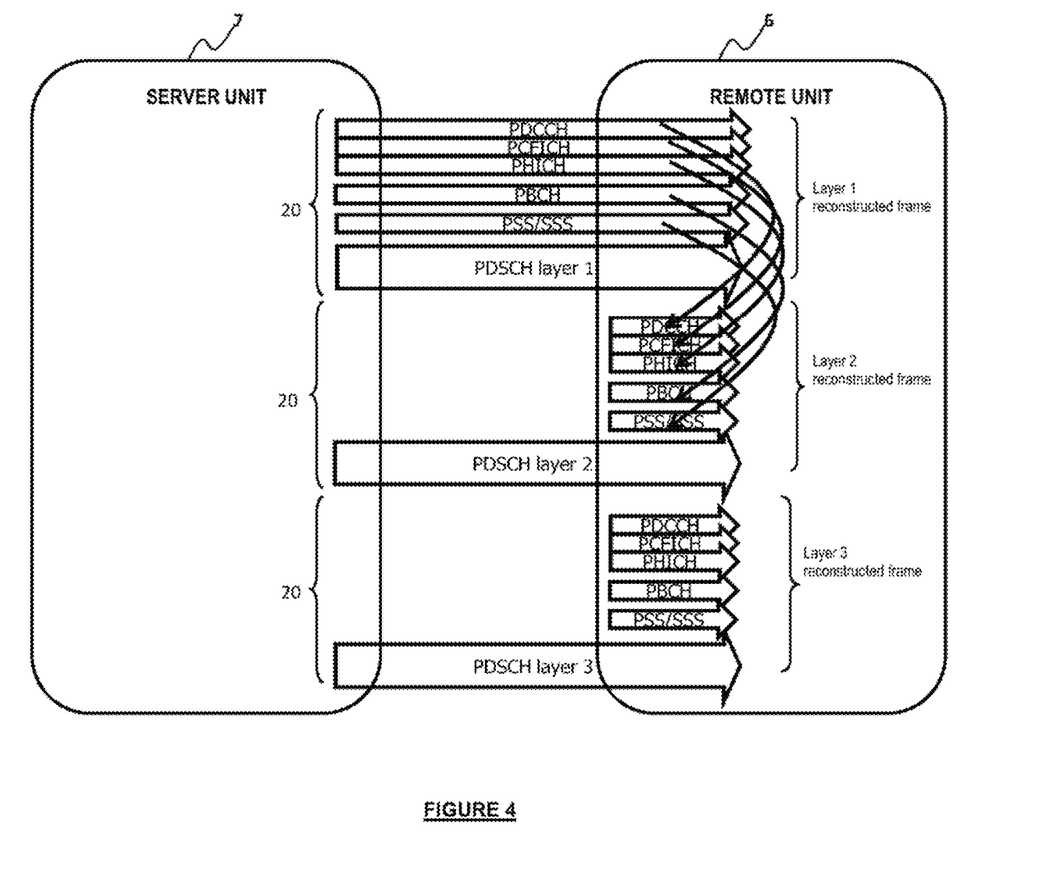
FIG. 4 represents a connection between a server unit and a remote unit, showing exemplary data transmitted on three different MIMO layers, according to some 10 embodiments.

FIG. 4 represents a connection between a Server Unit 7 and a Remote Unit 6, showing exemplary transmitted frames on three different MIMO layers, according to some embodiments.

As shown in FIG. 4, the SU 7 may provide several flows and packetize them into Ethernet frames (also called Ethernet packets) 20 before transmitting them to a RU 6.

In the Example of FIG. 4, the SU 7 transmitted the Control signals (PDCCH, PCFICH, PHICH, PBCH, PSS, SSS) on LAYER 1 and only the user data on LAYER 2 and LAYER 3 (PDSCH). The RU 6 received the three Ethernet Frames and reconstructed the Ethernet Frames received on LAYERS 2 and 3 by copying the control information included in the Frame received on LAYER 1.

Figure 5:
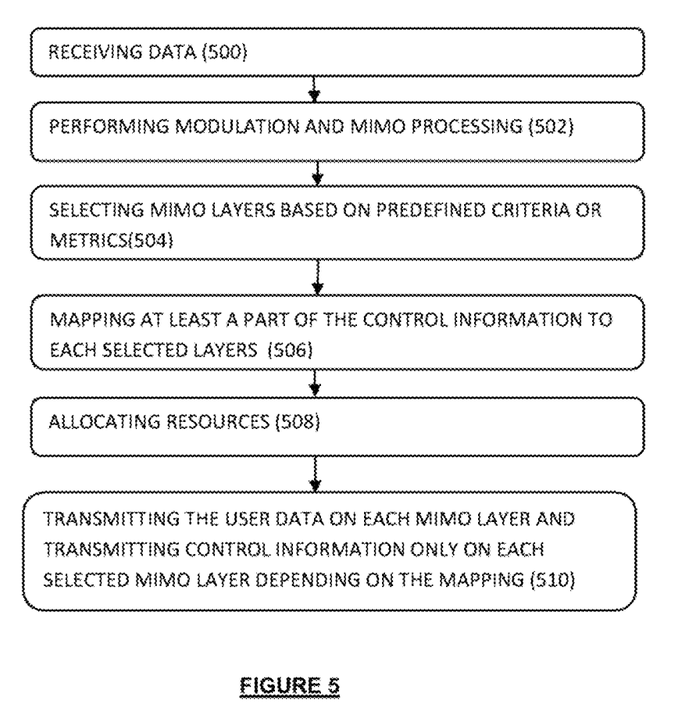
FIG. 5 is a flowchart depicting a method of transmitting a data signal from the Server Unit to a Remote Unit, on a set of MIMO layers, according to some embodiments.

FIG. 5 is a flowchart depicting a method of transmitting a data signal from the Server Unit 7 to a Remote Unit 6, on a set of MIMO layers, in a given direction (such as for example the downlink direction), according to some embodiments.

The data signal to be transmitted to the Remote Unit 6 comprises physical channel data ('user data') such as the PDSCH in the downlink, and control information. The control information may comprise physical control channels and/or synchronization signals.

A communication is initially established between the SU 7 and the RU 6.

In step 500, data is received by the SU 7 (such as data received from a base station 2 for transmission to one or more User Equipments 3) for transmission to the RU 6.

In step 502, modulation, layer mapping, and precoding steps (Modulation and MIMO processing) may be performed at the Server Unit. At this stage, the payload bits are already transformed in frequency domain IQs.

In step 504, one or more MIMO layers are selected based on predefined layer selection metric(s), such as a metric based on a combination of one or more CSI indicators.

In step 506, at least a part of the control signals are mapped to each selected MIMO layer based on predefined control information selection metric(s), such as for example a metric based on the QoS.

In step 508, the symbols are allocated to the resource elements.

In step 510, data are transmitted on each MIMO layer to the RU 6, through the fronthaul link 2, the data sent on the selected MIMO layers comprising the user data (e.g. PDSCH in the downlink) and the control signals mapped to the selected MIMO layer in step 506. The data sent on the remaining MIMO layers (unselected MIMO layers) comprise the same user data (PDSCH) without any control signal. Accordingly, while the user data is duplicated on all the MIMO layers, the control signals are only transmitted on selected MIMO layers.

In one embodiment, the number of selected MIMO layers may be strictly inferior to the total number of MIMO layers.

Advantageously, the various embodiments of the invention avoid duplicating the control information on the fronthaul link 2.

Figure 6:
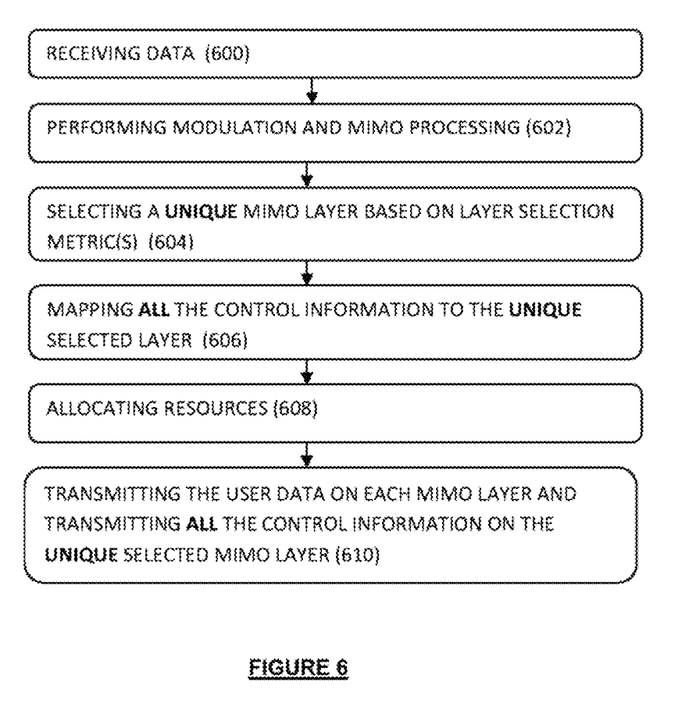
FIG. 6 is a flowchart depicting a method of transmitting a data signal comprising user data and control information from the Sever Unit to a Remote Unit, on a set of MIMO layers, according to another embodiment.

FIG. 6 is a flowchart depicting a method of transmitting a data signal comprising user data and control information from the Sever Unit 7 to a Remote Unit 6, on a set of MIMO layers, in a given direction (such as the downlink direction) according to another embodiment.

Steps 600 and 602 are similar to step 500 and 502 of FIG. 5.

In step 604, a unique MIMO layer is selected based on predefined layer selection metric (s), such as a metric based on a combination of one or more CSI indicators.

In step 606, all the control information are allocated to the unique selected MIMO layer.

In step 608, the symbols are allocated to the resource elements.

In step 610, the user data (e.g. the physical channels data PDSCH in the downlink direction) and all the control information of the data signal (e.g. the control channels PDCCH, PCFICH, PHICH, PBCH, PSS, and/or SSS, in the downlink direction) are sent on the selected MIMO layer while only the user data (e.g. PDSCH) is duplicated on the remaining MIMO layers through the fronthaul link 2 to the Remote Unit 6. Accordingly, a unique copy of all the control signals is sent only on the selected MIMO layer.

Figure 7:
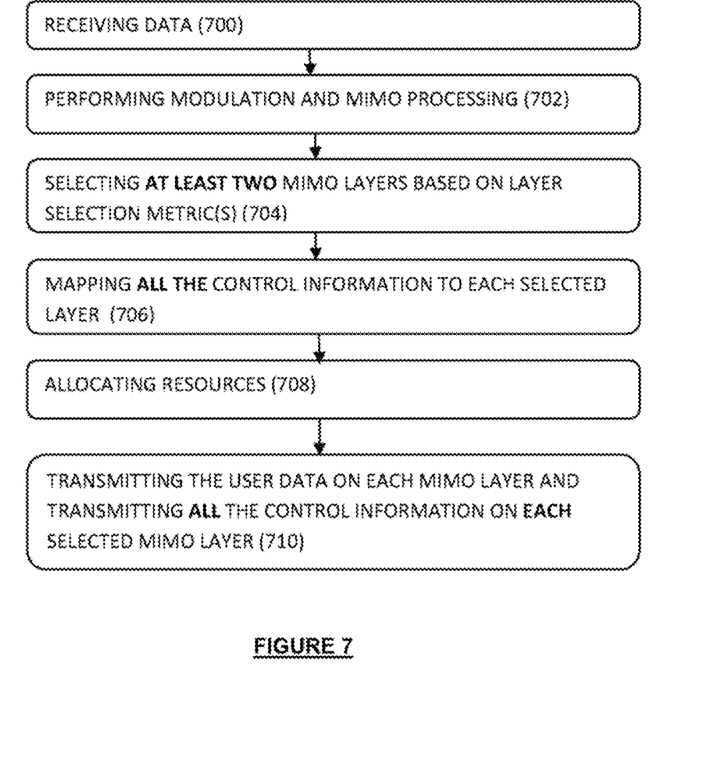
FIG. 7 is a flowchart depicting a method of transmitting a data signal from the Server Unit to a Remote Unit, on a set of MIMO layers, according to still another embodiment.

FIG. 7 is a flowchart depicting a method of transmitting a data signal from the Server Unit 7 to a Remote Unit 6, on a set of MIMO layers, in a given direction (such as the downlink direction), according to still another embodiment.

Steps 700 and 702 are similar to step 500 and 502 of FIG. 5.

In step 704, two or more MIMO layers are selected based on predefined layer selection metric(s) for transmission of the control channels, the number of selected MIMO layers being strictly inferior to the total number of MIMO layers.

In step 706, a copy of all the control signals (e.g. the control channels PDCCH, PCFICH, PHICH, PBCH, PSS, and/or SSS in the downlink direction) is mapped to each selected MIMO layer.

In step 708, the symbols are allocated to the resource elements.

In step 710, the user data (e.g. PDSCH in the downlink direction) and all the control information of the data signal (e.g. PDCCH, PCFICH, PHICH, PBCH, PSS, and/or SSS in the downlink direction) are sent only on each selected MIMO layer, while a copy of the user data (e.g. PDSCH) is sent on all the MIMO layers, through the fronthaul link 2 to the Remote Unit 6.

Accordingly, a limited number of copies of the control packets can be sent integrally on all the selected MIMO layers, while the other layers only transmit the user data (PDSCH) to the RU 6.

This enables optimization of the fronthaul resources.

Figure 8:
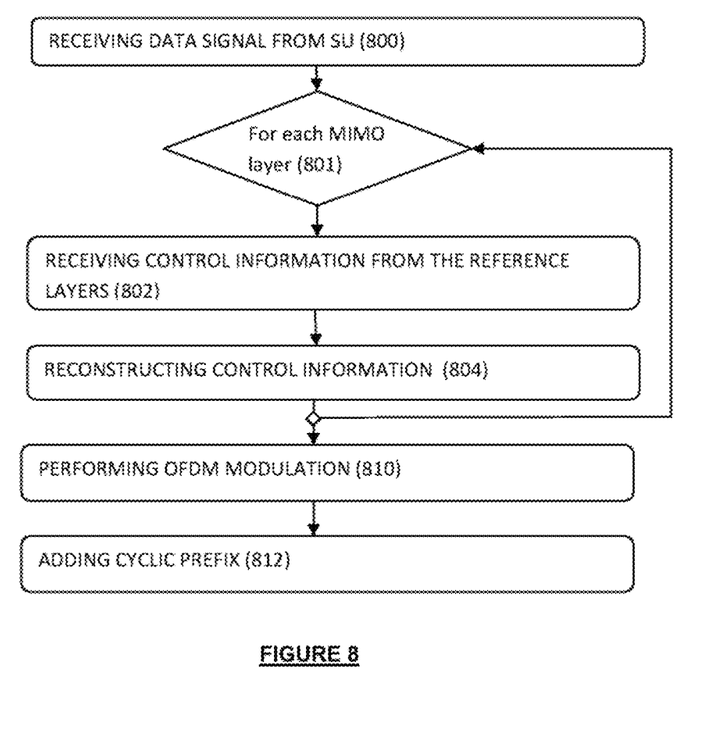
FIG. 8 depicts the method of performing downlink channel processing on a remote unit, according to some embodiments.

FIG. 8 depicts the method of performing downlink channel processing on a RU 6 in a CRAN, according to some embodiments.

In step 800, a data signal is received at the RU 6 from the SU 7 through the fronthaul link 2 on each MIMO layer. Each signal received on a reference MIMO layer may comprise user data (physical channel data such as PDSCH in the downlink) and one or more control channels data (e.g. PDCCH, PCFICH, PHICH, PBCH, PSS, and/or SSS in the downlink direction). A 'reference' MIMO layer corresponds to a MIMO layer selected at the SU 7 for carrying at least a part of the control information. A reference MIMO layer thus carries control information while the remaining MIMO layers do not carry such control information.

In some embodiments, a Mode Flag may be transmitted from the SU 7 to the RU 6 to identify a control information transmission mode among one the following three modes:

A first mode in which all the control information is sent by the SU 7 to the RU 6 on a unique reference MIMO layer;

A second mode in which the control information is split over a set of reference MIMO layers comprising at least two MIMO layers, a different part of the control information being sent on each reference MIMO layer;

A third mode in which all the control information is sent from the SU 7 to the RU 6 on each reference MIMO layer among the MIMO layers, the number of reference MIMO layers being at least equal to two and strictly inferior to the total number of MIMO layers (different copies of the control information are sent on each reference layer).

In such embodiment, the Mode Flag may be received by the RU 6 to facilitate reconstruction of the control information for each MIMO layer.

In step 802, each MIMO layer (block 801) communicates with one or more reference MIMO layer to receive a copy of the control information carried by the reference MIMO layer to the other MIMO layers. Step 801 and 802 may apply to the reference MIMO layers also in the second transmission mode where the control information is split over the reference MIMO layers at the SU 7. In the transmission modes where all the control information of the data signal is sent on each reference layer, each remaining MIMO layer may receive the control information from a unique reference layer in step 802.

In step 804, each MIMO layer reconstructs the integrality of the control information from the control information received from the reference MIMO layers.

Accordingly, at the end of the reconstruction method, each MIMO layer carries a same copy of the downlink physical channel data (e.g. PDSCH in the downlink) and of all the downlink control information (e.g. PDCCH, PCFICH, PHICH, PBCH, and/or PSS/SSS in the downlink).

In step 806, OFDM modulation may be performed including an inverse fast Fourier transform (IFFT) processing operation is performed to process the orthogonal frequency-division multiplexing (OFDM) symbols included in the received signal into a modulated signal using an inverse fast Fourier transform (IFFT) modulator.

In step 808, a CP may be added to the modulated signal.

Embodiments of the invention accordingly provide a system and method capable of dynamically integrating the control information into the data transmitted from the Server Unit 7 to a connected Remote Unit 6. This enables optimization of fronthaul resources while enabling fast recovery of the control information at the remote unit 6.

It should be noted that although the invention has been described in connection with a downlink communication, the invention also applies for the uplink communication as soon as the combination of the different spatial layers is above the Fronthaul network.

Although the invention has particular advantages in the downlink direction, it should be noted that the invention also applies to the uplink direction. In an uplink application of the invention, the user data are carried by the Physical Uplink Shared Channel (PUSCH). The PUSCH carries the UL-SCH, ACK/NACK and CQI (Channel Quality Indicator).

In the uplink, the control channels comprise the physical uplink control channel (PUCCH), and the physical random access channel (PRACH). The PUCCH carries Acknowledgements ACKs and/or Non Acknowledgements NACKs in response to downlink transmission. The PUCCH carries CQI (Channel Quality Indicator) report and SR (Scheduling Request). The PRACH is used to carry random access preamble for initial access of a UE to the network through transmission of random access preambles.

In a preferred embodiment, the uplink transmission between the SU 7 and the RU 6 may comprise transmitting the user data PUSCH on each uplink MIMO layer while transmitting the control information PUCCH on a unique selected MIMO layer, the PUCCH being rebuilt on the other uplink MIMO layers.

Embodiments of the present invention can take the form of an embodiment containing software only, hardware only or both hardware and software elements.

For example, the methods described herein, the SU 7 and/or the RU 6 according to embodiments of the invention, can be implemented according to a hardware and/or software implementation.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

It should be noted that the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

While embodiments of the invention have been illustrated by a description of various examples, and while these embodiments have been described in considerable detail, it is not the intent of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described.

The invention claimed is:

1. An apparatus, comprising:
at least one processor; and
at least one memory including computer program code;
the at least one memory and the computer program code configured to, with the at least one processor, cause the apparatus at least to:
receive data from a backhaul transport network and perform baseband processing;
transmit a data signal derived from the processed data to a remote unit over a number of multiple-input multiple-output (MIMO) layers, through a fronthaul link, the communication network comprising a physical layer, the data signal transmitted to the remote unit comprising physical user data and physical control data;

select at least one multiple-input multiple-output (MIMO) layer, and to map at least a part of the control data to said at least one selected multiple-input multiple-output (MIMO) layers; and send a copy of the physical user data on each multiple-input multiple-output (MIMO) layer, and the control data on the selected multiple-input multiple-output (MIMO) layers mapped thereto.

2. The apparatus of claim 1, wherein the at least one memory and the computer program code are further configured to select at least one multiple-input multiple-output (MIMO) layer based on at least one layer selection metric.

3. The apparatus of claim 2, wherein said at least one layer selection metric is based on one or more indicators comprised in a Channel Status Information (CSI), said indicators comprising a Channel Quality Indicator, a Precoding Matrix Index, a Rank Indicator.

4. The apparatus of claim 1, wherein the at least one memory and the computer program code are further configured to map at least a part of the control data to the at least one selected multiple-input multiple-output (MIMO) layers depending on at least one control data selection metric.

5. The apparatus of claim 4, wherein said at least one control data selection metric is based on a Quality Of Service.

6. The apparatus of claim 1, wherein the at least one memory and the computer program code are further configured to select a unique multiple-input multiple-output (MIMO) layer, and to map all the control data to said multiple-input multiple-output (MIMO) layer.

7. The apparatus of claim 1, wherein the at least one memory and the computer program code are further configured to select at least two multiple-input multiple-output (MIMO) layers, and to send a part of the control data on each selected multiple-input multiple-output (MIMO) layer mapped there to said part of the control data.

8. The apparatus of claim 1, wherein the at least one memory and the computer program code are further configured to select at least two multiple-input multiple-output (MIMO) layers, and to send all the control data on each selected multiple-input multiple-output (MIMO) layer, the number of selected multiple-input multiple-output (MIMO) layers being strictly inferior to the total number of multiple-input multiple-output (MIMO) layers.

9. The apparatus of claim 1, wherein the transmission direction is a downlink direction, the physical user data comprising downlink physical channels and the physical control data comprising downlink physical control channels or downlink physical synchronization signals.

10. The apparatus of claim 1, the physical user data comprising Physical Uplink Shared Channel (PUSCH) and the physical control data comprising physical uplink control channel (PUCCH).

11. The apparatus of claim 1, wherein the processing of the physical layer is split over the apparatus and the remote unit.

12. The apparatus according to claim 1, wherein the apparatus comprises a baseband unit in a communication network implanting a multiple-input multiple-output (MIMO) wireless communication.

13. An apparatus, comprising:
at least one processor; and
at least one memory including computer program code;
the at least one memory and the computer program code configured to, with the at least one processor, cause the apparatus at least to:

receive a data signal on a set of multiple-input multiple-output (MIMO) layers from a baseband unit (BBU) via a fronthaul communication link, the data signal comprising physical user data and one or more physical control data, said set of multiple-input multiple-output (MIMO) layers comprising one or more reference multiple-input multiple-output (MIMO) layers carrying the physical user data and at least a part of the physical control data, and said set of multiple-input multiple-output (MIMO) layers comprising one or more remaining multiple-input multiple-output (MIMO) layers carrying a copy of the user data;

communicate with at least one wireless mobile device via an air interface; and reconstruct the physical control channels on each multiple-input multiple-output (MIMO) layer from the physical control data carried by the one or more reference multiple-input multiple-output (MIMO) layers, in response to the receipt of the data signal.

14. The apparatus according to claim 13, wherein the apparatus comprises a remote radio unit in a network implementing a multiple-input multiple-output (MIMO) wireless network.

15. A method of transmitting data from a baseband unit to a remote unit in a communication network implementing a multiple-input multiple-output (MIMO) wireless communication, the baseband unit being configured to receive data from a backhaul transport network and perform baseband processing, a data signal derived from the processed data being transmitted to the remote unit over a number of multiple-input multiple-output (MIMO) layers, through a fronthaul link, the communication network comprising a physical layer, the data signal transmitted to the remote unit comprising physical user data and physical control data, wherein the method further comprises selecting at least one multiple-input multiple-output (MIMO) layer, mapping at least a part of the control data to said at least one selected multiple-input multiple-output (MIMO) layers, and sending a copy of the physical user data on each multiple-input multiple-output (MIMO) layer and the control data on the selected multiple-input multiple-output (MIMO) layers mapped thereto.

16. A computer program product embodied on a non-transitory computer-readable medium, said computer-readable medium containing computer program code which, when executed by one or more processors, causes the one or more processors to:

select at least one multiple-input multiple-output (MIMO) layer in a communication network implementing multiple-input multiple-output (MIMO) wireless communication, wherein the communication network includes a baseband unit and a remote unit wherein the baseband unit is configured to receive data from a backhaul transport network and perform baseband processing, a data signal derived from the processed data being transmitted to the remote unit over a number of multiple-input multiple-output (MIMO) layers, through a fronthaul link, the communication network comprising a physical layer, the data signal transmitted to the remote unit comprising physical user data and physical control data;

map at least a part of the control data to said at least one selected multiple-input multiple-output (MIMO) layers; and send a copy of the physical user data on each multiple-input multiple-output (MIMO) layer, and the control data on the selected multiple-input multiple-output (MIMO) layers mapped thereto.

* * * * *